United States Patent
Bodin et al.

(10) Patent No.: US 8,533,281 B2
(45) Date of Patent: Sep. 10, 2013

(54) CENTRALIZED MANAGEMENT OF MOBILE ASSETS—PUSH BASED MANAGEMENT OF CORPORATE ASSETS

(75) Inventors: William K Bodin, Austin, TX (US); David Jaramillo, Boca Raton, FL (US); Derral C. Thorson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 369 days.

(21) Appl. No.: 12/629,799

(22) Filed: Dec. 2, 2009

(65) Prior Publication Data

US 2011/0131051 A1   Jun. 2, 2011

(51) Int. Cl.
*G06F 17/30* (2006.01)

(52) U.S. Cl.
USPC ............................................. 709/207

(58) Field of Classification Search
USPC ................... 709/207, 204, 206, 217–219
See application file for complete search history.

(56) References Cited

U.S. PATENT DOCUMENTS

| | | |
|---|---|---|
| 6,289,339 B1 | 9/2001 | Weber |
| 6,330,555 B1 | 12/2001 | Weber |
| 6,546,388 B1 | 4/2003 | Edlund et al. |
| 6,618,593 B1 | 9/2003 | Drutman et al. |
| 7,275,243 B2 | 9/2007 | Gibbons et al. |
| 7,349,894 B2 | 3/2008 | Barth et al. |
| 7,464,075 B2 | 12/2008 | McSherry et al. |
| 7,499,965 B1 | 3/2009 | Chai |
| 7,502,610 B2 | 3/2009 | Maher |
| 7,522,058 B1 | 4/2009 | Light et al. |
| 7,526,459 B2 | 4/2009 | Flinn et al. |
| 7,593,740 B2 * | 9/2009 | Crowley et al. ............ 455/456.3 |
| 7,801,888 B2 * | 9/2010 | Rao et al. ........................ 707/728 |
| 7,813,741 B2 * | 10/2010 | Hendrey et al. ............ 455/456.1 |
| 7,831,654 B1 * | 11/2010 | Magsamen, Jr. et al. ..... 709/200 |
| 7,895,177 B2 * | 2/2011 | Wu ................................ 707/706 |
| 7,966,320 B2 * | 6/2011 | Roshen ......................... 707/723 |
| 7,996,487 B2 * | 8/2011 | Snyder .......................... 709/217 |

(Continued)

FOREIGN PATENT DOCUMENTS

JP   2008-060772   3/2008

OTHER PUBLICATIONS

Oracle, "Oracle Database Sample Schemas 10g Release 1 (10.1)," Dec. 2003, Oracle, docs.oracle.com/cd/B14117_01/server.101/b10771.pdf.*

(Continued)

*Primary Examiner* — Ruolei Zong
(74) *Attorney, Agent, or Firm* — Cahn & Samuels, LLP; Louis J. Percello, Esq.

(57) ABSTRACT

An embodiment of the invention provides a method for the centralized management of mobile assets. A central repository of assets is built, wherein the central repository includes a private asset section and a public asset section. The private asset section is only accessible to subscribers of the private asset section. A processor automatically pushes at least one base asset from the central repository onto a mobile device of the subscriber. The base assets are selected by an administrator of the central repository of assets, an employer of the subscriber, and/or an employee of subscriber's company. The base assets are selected based on attributes of the subscriber, the mobile device of the subscriber, and/or popularity of assets. In response to a search query for a requested asset by a user, the processor pushes the requested asset from the central repository onto the mobile device of the user.

25 Claims, 3 Drawing Sheets

(56) References Cited

U.S. PATENT DOCUMENTS

| | | | |
|---|---|---|---|
| 8,041,372 B1* | 10/2011 | Minns et al. | 455/456.3 |
| 2002/0065721 A1 | 5/2002 | Lema et al. | |
| 2003/0033434 A1 | 2/2003 | Kavacheri et al. | |
| 2004/0003096 A1 | 1/2004 | Willis | |
| 2004/0015567 A1 | 1/2004 | Ziebold et al. | |
| 2004/0162830 A1 | 8/2004 | Shirwadkar et al. | |
| 2005/0222819 A1 | 10/2005 | Boss et al. | |
| 2006/0074980 A1 | 4/2006 | Sarkar | |
| 2006/0080397 A1* | 4/2006 | Chene et al. | 709/213 |
| 2006/0242030 A1 | 10/2006 | Blanchard, Jr. | |
| 2006/0253582 A1 | 11/2006 | Dixon et al. | |
| 2006/0265661 A1 | 11/2006 | Ball | |
| 2007/0094142 A1 | 4/2007 | Russell et al. | |
| 2007/0100824 A1 | 5/2007 | Richardson et al. | |
| 2007/0223401 A1 | 9/2007 | Chatterjee et al. | |
| 2008/0032739 A1* | 2/2008 | Hoodbhoy et al. | 455/556.2 |
| 2008/0097867 A1 | 4/2008 | Engle | |
| 2008/0098062 A1 | 4/2008 | Balia | |
| 2008/0102856 A1 | 5/2008 | Fortescue et al. | |
| 2008/0103913 A1 | 5/2008 | Leach | |
| 2008/0154856 A1 | 6/2008 | Riise et al. | |
| 2008/0162431 A1 | 7/2008 | Xu et al. | |
| 2008/0189334 A1 | 8/2008 | Mathur | |
| 2008/0222106 A1 | 9/2008 | Rao et al. | |
| 2008/0301112 A1 | 12/2008 | Wu | |
| 2008/0320222 A1 | 12/2008 | Dhodapkar | |
| 2009/0024992 A1 | 1/2009 | Kulaga et al. | |
| 2009/0034463 A1* | 2/2009 | Rao | 370/329 |
| 2009/0049518 A1 | 2/2009 | Roman et al. | |
| 2009/0077062 A1* | 3/2009 | Spivack et al. | 707/5 |
| 2009/0119183 A1 | 5/2009 | Azimi et al. | |
| 2009/0150400 A1 | 6/2009 | Abu-Hakima et al. | |
| 2010/0146057 A1 | 6/2010 | Abu-Hakima et al. | |
| 2011/0107379 A1 | 5/2011 | Lajoie et al. | |
| 2011/0131237 A1 | 6/2011 | Macaluso | |

OTHER PUBLICATIONS

Adams, B., et al., "Extraction of Social Context and Application to Personal Multimedia Exploration," MM'06, Oct. 23-27, 2006, p. 987-996, Santa Barbara, California, USA.

Bandara, U., et al., "Tagciti: A Practical Approach for Location-Aware and Socially-Relevant Information Creation and Discovery for Mobile Users," IEEE International Symposium on Wireless Communication Systems (ISWCS), 2008, p. 118-122, Piscataway, NJ, USA.

Borodin, Y, et al., "Context Browsing with Mobiles—When Less is More," MobiSys '07, Jun. 11-14, 2007, p. 3-15, San Juan, Puerto Rico, USA.

Cachia, R., et al., "Grasping the Potential of Online Social Networks for Foresight," Technological Forecasting & Social Change, Oct. 2007, p. 179-1203, vol. 74, No. 8.

Davis, Marc, et al., "From Context to Content: Leveraging Context to Infer Media Metadata," MM '04, Oct. 10-16, 2004, p. 188-195, New York, New York, USA.

Java, Akshay, et al., "Why We Twitter: Understanding Microblogging Usage and Communities," Joint 9th WEBKDD and 1st SNA-KDD Workshop '07, Aug. 12, 2007, p. 56-59, San Jose, California, USA.

Park, J., et al., "Design and Implementation of SyncML Based Application Management System for Mobile Devices," Chongbo Kwahakhoe Nonmunji. Kompyuting ui Silche (J. of KISS, Korea Information Science Society, Computing Practices, Feb. 2002, p. 62-70, vol. 8, Issue 1.

Krum, David M., et al., "Situational Visualization," VRST '01, Nov. 15-17, 2001, p. 143-150, Banff, Alberta, Canada.

Troshynski, Emily, et al., "Accountabilities of Presence: Reframing Location-Based Systems," CHI 2008 Proceedings, Apr. 5-10, 2008, p. 487, 496, Florence, Italy.

Wilairat, Weerapan, "Feature-Accessibility Control Using Theme/Style Switching," 2008 Microsoft, Dec. 2, 2008.

Download.com search results for the search term "antivirus" [online], [retrieved Dec. 4, 2009]. Retrieved from the Internet <URL: http://download.cnet.com/1770-20_40.html?query=antivirus&tag=srch%3Ba&searchtype=downloads&filterName=platform%3DWindows&filter=platform%3DWindows>.

Amazon.com search results for the search term "science fiction movies" [online], [retrieved Dec. 4, 2009]. Retrieved from the Internet <URL: http://www.amazon.com/s/ref=nb_ss?url=search-alias%3Daps&field-keywords=science+fiction+movies&x=0&y=0>.

Expedia.com search results for the search term "Washington, DC" hotels; check-in "Dec. 5, 2009", check-out "Dec. 6, 2009" [online], [retrieved Dec. 4, 2009]. Retrieved from the Internet <URL: http://www.expedia.com/Hotels?rfrr=-905&>.

Chirita, P., et al., "P-Tag: Large Scale Automatic Generation of Personalized Annotation TAGs for the Web," International World Wide Web Conference Committee, WWW 2007, May 8-12, 2007, Session: Semantic Web and Web 2.0.

* cited by examiner

CENTRALIZED MANAGEMENT OF MOBILE ASSETS—PUSH BASED MANAGEMENT OF CORPORATE ASSETS

FIELD OF THE INVENTION

The present invention is in the field of methods, systems, and computer program products for the centralized management of mobile assets.

SUMMARY

An embodiment of the invention includes a method for the centralized management of mobile assets. A central repository of assets is built, wherein the central repository includes a private asset section and a public asset section. The private asset section is only accessible to subscribers of the private asset section. In at least one embodiment, the subscribers are employees of a business organization owning or leasing the central repository of assets. The central repository of assets is updated with newly available assets and assets satisfying a predetermined level of popularity. A processor automatically pushes at least one base asset from the central repository onto mobile devices of the subscribers. The automatic pushing of the base assets is performed transparent to the subscribers. The base assets are selected by an administrator of the central repository of assets, an employer of the subscribers, and/or an employee of the subscribers' company.

The base assets are selected based on attributes of the subscribers, the mobile devices of the subscribers, and/or popularity of assets. The attributes of the subscribers include job responsibilities, job level, employer, business unit, subscriber affiliation, and/or geographic location. The popularity of the assets is determined based on user tags and/or user quality ratings.

In response to a search query for a requested asset by a user, the processor pushes the requested asset onto the mobile device of the user from the central repository. The requested asset is an asset commonly used by employees of the user's employer and/or the user's business unit.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides methods, systems, and computer program products for managing mobile assets (e.g., mobile applications and/or web applications) through social computing. A central repository of mobile assets is built so that users can quickly find and install relevant assets onto their mobile devices. Furthermore, system administrators, carriers, and/or corporate administrators can transparently deploy a standard set of mobile assets from the central repository onto the mobile devices of users/consumers. Thus, users are able to pull and administrators are able to push common sets of mobile assets onto the mobile devices. As users/consumers get or replace their mobile device, they will quickly have their new mobile device up and running because the system is device agnostic.

In at least one embodiment of the invention, the central repository is updated with new assets. Therefore, when a new asset becomes available or an existing asset becomes more popular, the assets are readily available to the user without the need for extensive searching.

In at least one embodiment, a system includes a client and server. The client includes a user interface that allows the user to quickly search, add, remove, and/or move assets or subscriptions of assets on their mobile device. Through the use of web services, the client communicates to the server components to add, edit, delete, and/or search for assets and subscriptions. In addition, the client communicates to the server components to rate and/or comment on any assets and subscriptions.

Figure 1:
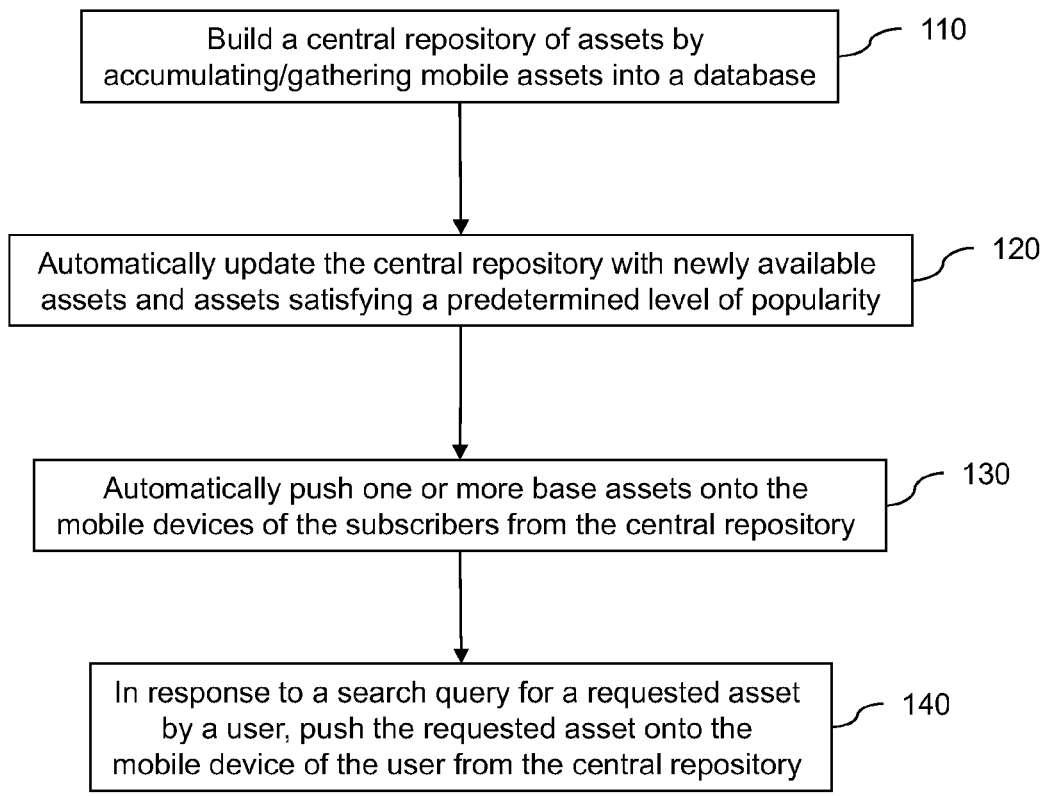
FIG. 1 is a flow diagram illustrating a method for centralized management of mobile assets according to an embodiment of the invention.

FIG. 1 is a flow diagram illustrating a method for centralized management of mobile assets according to an embodiment of the invention. A central repository of assets is built (110) by accumulating/gathering mobile assets into a database (or means for storing a central repository of assets). The central repository includes a private asset section and a public asset section. The public asset section is accessible by all users; however, the private asset section is only accessible to subscribers of the central repository. In at least one embodiment, the subscribers include employees of a particular business organization. In another embodiment, the business organization owns or leases the central repository. In yet another embodiment, the subscribers include employees within a particular business unit (e.g., human resources, marketing, copy center, research and development, technical support) of the business organization.

A monitoring module (or means for updating the central repository of assets) automatically updates the central repository with newly available assets and assets satisfying a predetermined level of popularity (e.g., as set by a user or system administrator) (120). In at least one embodiment, as described more fully below, user tags and/or user quality ratings are utilized to determine the popularity of a mobile asset. When a mobile asset reaches a predetermined level of popularity (e.g., 100 or more user tags), the mobile asset is added to the central repository.

A processor (or means for automatically pushing at least one base asset from the central repository of assets) is connected to the central repository and automatically pushes/downloads one or more base assets onto the mobile devices of the subscribers from the central repository (e.g., private asset section) (130). In another embodiment, the processor is in the mobile devices. In at least one embodiment, the pushing of the base assets is performed transparent to the subscriber. The base assets are selected by an administrator of the central repository, the subscriber's employer, and/or another employee of the subscriber's employer (e.g., the subscriber's supervisor/manager). In another embodiment, the base assets are automatically selected by the processor, as described more fully below.

In at least one embodiment, the base assets are selected based on attributes of the subscriber, which include job responsibilities (e.g., clerical, sales, accounting, IT support, level of travel, time percentage out of the office, level of telecommuting) and/or job level (e.g., senior management, supervisory, entry-level). In another embodiment, the attributes of the subscriber include the subscriber's employer and/or business unit (e.g., human resources, marketing, copy center, research and development). In yet another embodiment, the attributes of the subscriber include the subscriber's geographic location (e.g., office complex, zip code, city, state, time zone, country) and/or affiliations of the subscriber (e.g., member of certain professional organizations or associations). In at least one embodiment, the attributes of the subscriber are manually entered by the subscriber and/or an employee of the subscriber's company via a graphic user interface. In another embodiment, the attributes of the subscriber are automatically retrieved from a company database including employee profiles.

In at least one embodiment of the invention, the base assets are selected based on the mobile device of the subscriber (i.e., attributes/capabilities of the mobile device). In at least one embodiment, the attributes of the mobile device include media format capabilities, codec types, operating system, Bluetooth capabilities, speakerphone capabilities, processing speed, signal strength, screen size, screen resolution, keyboard features (e.g., QWERTY keyboard, touch screen), camera/video capabilities, global positioning system (GPS) capabilities, and/or cost of the mobile device. In another embodiment, the attributes of the mobile device include compatible web applications (i.e., a list of web applications that the mobile device is capable of running) and/or compatible mobile applications (i.e., a list of mobile applications that the mobile device is capable of running). In yet another embodiment, the attributes of the mobile device include business affiliations of users of the mobile device (e.g., 50% of the employees at company X utilize the mobile device) and/or business unit affiliations of the mobile device (e.g., 2% of the employees in the accounting division utilize the mobile device). In at least one embodiment, the attributes of the mobile device are obtained from the manufacturer of the device (e.g., Nokia™), device retailers (e.g., Best Buy™), and/or telecommunications service providers (e.g., Verizon Wireless™).

In at least one embodiment, the base assets are selected based on the popularity of the assets, wherein popularity is determined based on the number and type of user tags. More specifically, users who recommend a particular asset electronically mark/label the recommended asset with a user tag. In another embodiment, the user tags are associated with assets that are not recommended by users. In yet another embodiment, the net positive or negative value of the total combined user tags is used, e.g., if an asset has 87 positive user tags and 71 negative user tags, the asset has a positive user tag value of 16.

In at least one embodiment, popularity is determined based on user quality ratings, which include, for example, a five-star rating system, a numerical rating system, an alphabetical grading system, and/or a binary scoring system (e.g., a thumbs up/down system). In at least one embodiment, user quality ratings of assets are gathered from multiple sources having different grading systems, wherein a uniform rating system for the assets is created based on the scores from the different grading systems.

In at least one embodiment of the invention, the system includes a backend repository, which is a server that provides assets to mobile devices via a set of web services. When assets are used by the mobile devices, the web services record the time, date, location, list of asset(s) used, user feedback regarding the asset(s) used (e.g., user tags and/or user quality ratings), and/or list of the mobile device(s) using the asset(s). These metrics are collected, stored in a database, and subsequently retrieved to determine the popularity of the assets.

In at least one embodiment of the invention, the processor automatically selects the base assets based on the subscriber's attributes, the mobile device attributes, and/or popularity of assets. In at least one embodiment, the subscriber's attributes, the mobile device attributes, and the popularity of assets are weighted equally. For example, the subscriber's job level, the processing speed of the mobile device, and the 4-star rating of the asset are weighted equally with respect to one another (i.e., 33%, 33%, 33%). For example, if asset X has a subscriber attribute score of 4, a mobile device attribute score of 2, and a popularity score of 1, then asset X has an average score of 2.3.

In another embodiment, the subscriber's attributes, the mobile device attributes, and the popularity of assets are assigned different weights (e.g., 66.4%, 16.8%, and 16.8%, respectively), as determined by the subscriber's employer and/or an administrator. For example, an administrator may consider the mobile device's capability of running web application X more important than the subscriber's entry-level position. In another example, the subscriber's employer may consider the subscriber's upper-level management position more important than mobile application Y's low number of user tags. Thus, for example, given the above weighted scale of 66.4%, 16.8%, and 16.8%, if asset Y has a subscriber attribute score of 4, a mobile device attribute score of 2, and a popularity score of 1, then asset Y has a weighted average score of 3.2. Accordingly, the employer and/or administrator can assign different weights to the subscriber's attributes, the mobile device attributes, and the popularity of assets.

Furthermore, the individual attributes within the subscriber attributes and mobile device attributes are weighted equally in at least one embodiment of the invention. For example, the subscriber's job level is weighed equally respective to the subscriber's geographic location; and, the signal strength device attribute is weighed equally respective to the cost device attribute. Thus, for example, if asset Z has scores of 5, 3, and 1 for the subscriber attributes job level, business unit, and location, respectively, then asset Z has an average subscriber attribute score of 3.0.

In another embodiment, different attributes are assigned different weights, as determined by the subscriber's employer and/or system administrator. For example, the employer may consider a subscriber's job responsibilities more important than his affiliation with a particular professional organization. In another example, an administrator may consider the processing speed of the mobile device more important than the screen size. Thus, for example, an administrator assigns a weighted scale of 50%, 25%, 12.5%, and 12.5% for the device attributes media format capabilities, codec types, processing speed, and cost of the mobile device, respectively. If asset W has a media format capabilities score of 1, codec type score of 4, processing speed score of 3, and cost score of 3, then asset W has a weighted average score of 2.25.

Accordingly, the employer and/or administrator can assign different weights to the subscriber attributes and/or mobile device attributes. In at least one embodiment of the invention, the user tags and user quality ratings are weighted equally (i.e., 50% and 50%). In an another embodiment, however, the subscriber's employer and/or system administrator can assign a higher or lower weight to the user tags.

In response to a search query for a requested asset by a user, the requested asset is pushed/downloaded onto the mobile device of the user from the central repository (140). The user is a subscriber having access to the private asset section and the public asset section, or a non-subscriber only having access to the public asset section. Thus, the requested asset is pushed from either the private asset section or the public asset section. In at least one embodiment, the requested asset is an asset commonly used by employees of the user's business organization and/or employees of the user's business unit. Therefore, as described above, the method provides a central repository for users to quickly locate and retrieve relevant assets for their mobile devices.

Figure 2:
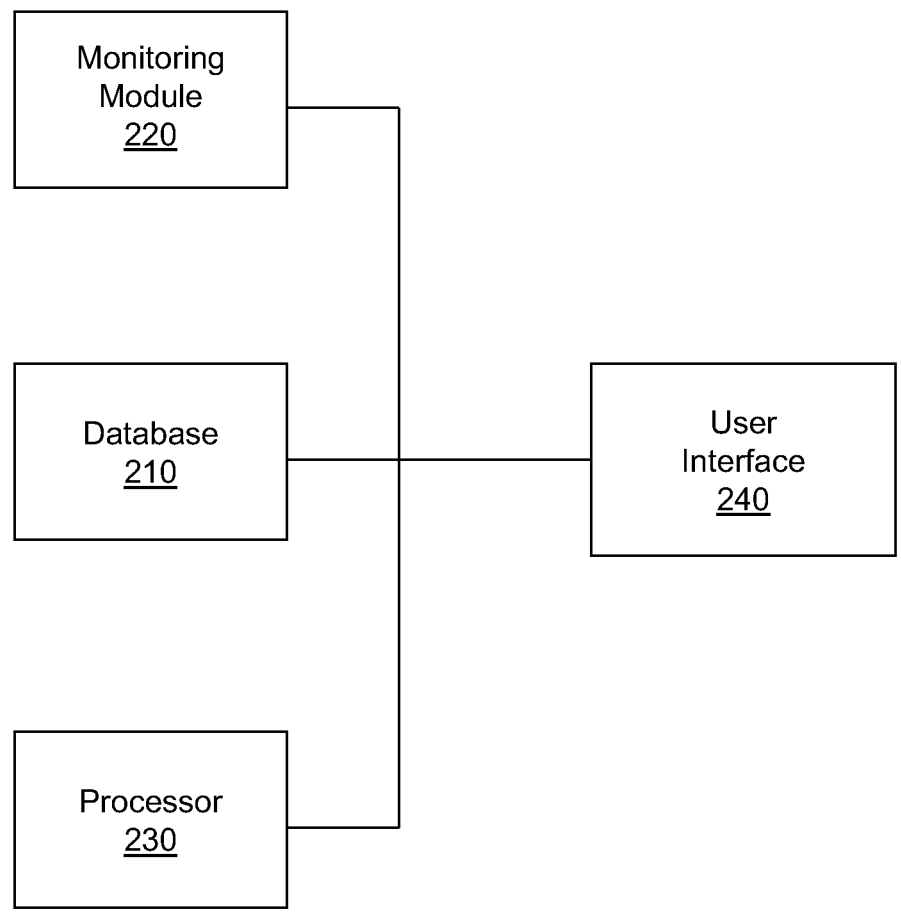
FIG. 2 illustrates a system for centralized management of mobile assets according to an embodiment of the invention.

FIG. 2 illustrates a system for centralized management of mobile assets according to an embodiment of the invention. A database 210 includes a central repository of assets. The central repository of assets includes a private asset section and a public asset section, wherein the private asset section is only accessible to subscribers of the private asset section. In at least one embodiment, the subscribers are employees of a business organization owning or leasing the central repository of assets. A monitoring module 220 updates the central repository of assets with newly available assets and assets satisfying a predetermined level of popularity.

The system includes a processor 230 for automatically pushing/downloading at least one base asset from the central repository onto mobile devices of the subscribers. In at least one embodiment, the base assets are automatically pushed transparent to the subscribers.

The system further includes a user interface 240 (or means for selecting the at least one base asset) for selecting the base assets, which are selected by an administrator of the central repository of assets, an employer of the subscribers, and/or an employee of the subscribers' company. The base assets are selected based on attributes of the subscribers, the mobile devices of the subscribers, and popularity of assets. The attributes of the subscribers include job responsibilities, job level, employer, business unit, subscriber affiliation, and/or geographic location. The monitoring module 220 determines the popularity of the assets based on user tags and/or user quality ratings.

In response to a search query for a requested asset by a user, the processor 230 pushes/downloads the requested asset from the central repository onto a mobile device of the user. The requested asset is an asset commonly used by employees of the user's employer and/or employees of the user's business unit.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 3:
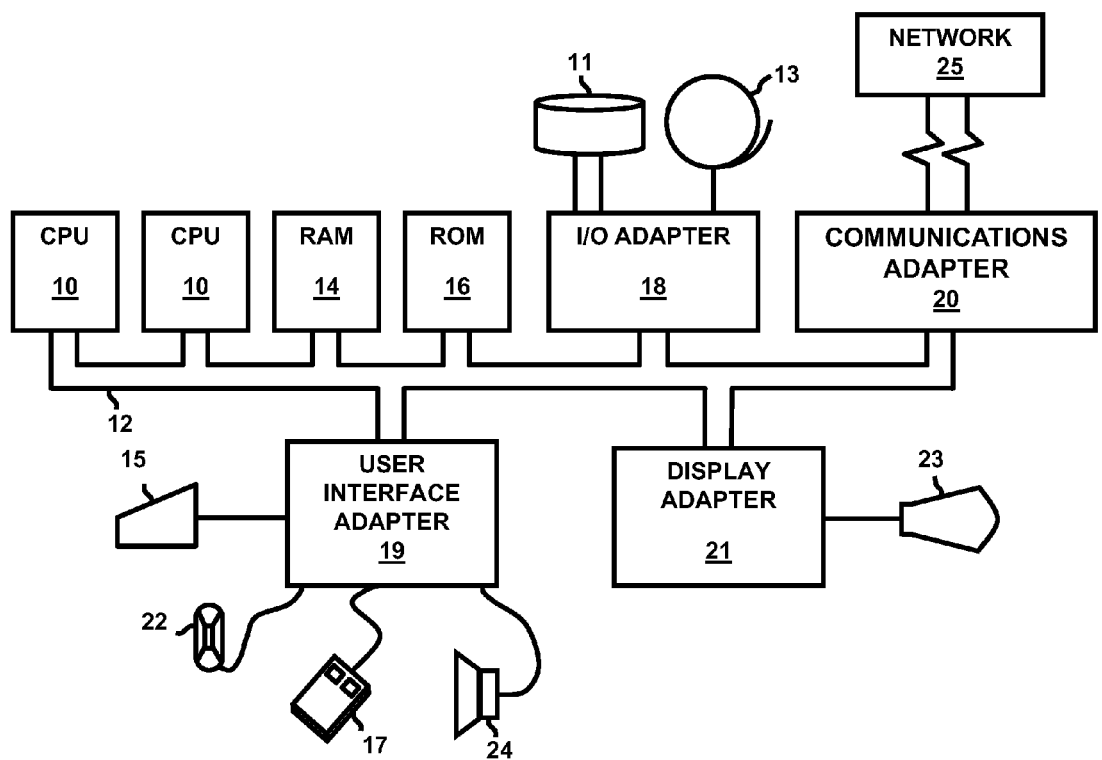
FIG. 3 illustrates a computer program product according to an embodiment of the invention.

Referring now to FIG. 3, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    building a central repository of assets including a private asset section and a public asset section, the private asset section only accessible to a subscriber of the private asset section;
    updating the central repository of assets with newly available assets and assets satisfying a predetermined level of popularity;
    automatically pushing with a processor at least one base asset from the central repository of assets onto a mobile device of the subscriber, the at least one base asset is selected based on attributes of the mobile device of the subscriber, capabilities of the mobile device of the subscriber, and popularity of assets, the popularity of the assets being determined based on a net value of positive user tags and negative user tags; and
    in response to a search query for a requested asset by a user, pushing the requested asset from the central repository of assets onto a mobile device of the user with the processor.

2. The method according to claim 1, wherein the at least one base asset is selected by at least one of an administrator of the central repository of assets, an employer of the subscriber, and an employee of the employer of the subscriber, and
    wherein the at least one base asset is further selected based on attributes of the subscriber.

3. The method according to claim 2, wherein the attributes of the subscriber include at least two of job responsibilities, job level, employer, business unit, subscriber affiliation, and geographic location.

4. The method according to claim 2, wherein the popularity of assets is determined using user quality ratings.

5. The method according to claim 1, wherein the automatically pushing of the at least one base asset is performed transparent to the subscriber.

6. The method according to claim 1, wherein the subscriber is an employee of a business organization having access to the central repository of assets.

7. The method according to claim 1, wherein the requested asset is an asset commonly used by employees of at least one of the user's employer and the user's business unit.

8. A method, comprising:
    building a central repository of assets including a private asset section and a public asset section, the private asset section only accessible to an employee of a business organization;
    updating the central repository of assets with newly available assets and assets satisfying a predetermined level of popularity;

automatically pushing with a processor at least one base asset from the central repository of assets onto a mobile device of the employee, the at least one base asset is selected based on attributes of the mobile device of the subscriber, capabilities of the mobile device of the subscriber, and popularity of assets, the attributes of the mobile device of the subscriber, the capabilities of the mobile device of the subscriber, and the popularity of assets being assigned different weights; and in response to a search query for a requested asset by a user, pushing the requested asset from the central repository of assets onto a mobile device of the user with the processor.

9. The method according to claim 8, wherein the at least one base asset is selected by at least one of an administrator of the central repository of assets, the business organization, and an employee of the business organization, and wherein the at least one base asset selected based on attributes of the employee.

10. The method according to claim 9, wherein the attributes of the employee include job responsibilities, job level, the business organization, business unit within the business organization, employee affiliation, and geographic location.

11. The method according to claim 9, wherein the popularity of assets is determined using user tags and user quality ratings.

12. The method according to claim 8, wherein the automatically pushing of the at least one base asset is performed transparent to the employee.

13. The method according to claim 8, wherein the requested asset is an asset commonly used by employees of the user's employer and the user's business unit.

14. A system, comprising:
a database including a central repository of assets, the central repository of assets including a private asset section and a public asset section, the private asset section only accessible to a subscriber of the private asset section;
a monitoring module, said monitoring module updating the central repository of assets with newly available assets and assets satisfying a predetermined level of popularity; and
a processor for automatically pushing at least one base asset from the central repository of assets onto a mobile device of the subscriber and pushing, in response to a search query for a requested asset by a user, the requested asset from the central repository of assets onto a mobile device of the user, the at least one base asset is selected based on attributes of the mobile device of the subscriber, capabilities of the mobile device of the subscriber, and popularity of assets, the popularity of the assets being determined based on a net value of positive user tags and negative user tags.

15. The system according to claim 14, further including a user interface for selecting the at least one base asset,
the at least one base asset selected by at least one of an administrator of the central repository of assets, an employer of the subscriber, and an employee of the employer of the subscriber,
the at least one base asset selected based on attributes of the subscriber.

16. The system according to claim 15, wherein the attributes of the subscriber include at least two of job responsibilities, job level, employer, business unit, subscriber affiliation, and geographic location.

17. The system according to claim 15, wherein the monitoring module determines the popularity of assets based on user quality ratings.

18. The system according to claim 14, wherein the processor automatically pushes the at least one base asset transparent to the subscriber.

19. The system according to claim 14, wherein the subscriber is an employee of a business organization one of owning and leasing the central repository of assets.

20. The system according to claim 14, wherein the requested asset is an asset commonly used by employees of at least one of the user's employer and the user's business unit.

21. A system, comprising:
means for storing a central repository of assets, the central repository of assets including a private asset section and a public asset section, the private asset section only accessible to a subscriber of the private asset section;
means for updating the central repository of assets with newly available assets and assets satisfying a predetermined level of popularity; and
means for automatically pushing at least one base asset from the central repository of assets onto a mobile device of the subscriber and pushing, in response to a search query for a requested asset by a user, the requested asset from the central repository of assets onto a mobile device of the user, the at least one base asset is selected based on attributes of the mobile device of the subscriber, capabilities of the mobile device of the subscriber, and popularity of assets, the attributes of the mobile device of the subscriber, the capabilities of the mobile device of the subscriber, and the popularity of assets being assigned different weights.

22. The system according to claim 21, further including a means for selecting the at least one base asset,
the at least one base asset selected by at least one of an administrator of the central repository of assets, an employer of the subscriber, and an employee of the employer of the subscriber,
the at least one base asset selected based on attributes of the subscriber.

23. The system according to claim 22, wherein the attributes of the subscriber include at least three of job responsibilities, job level, employer, business unit, subscriber affiliation, and geographic location.

24. The system according to claim 22, wherein the means for updating the central repository of assets determines the popularity of assets based on user tags and user quality ratings.

25. A computer program product, comprising:
a non-transitory computer readable storage medium;
first program instructions to build a central repository of assets including a private asset section and a public asset section, the private asset section only accessible to a subscriber of the private asset section;
second program instructions to update the central repository of assets with newly available assets and assets satisfying a predetermined level of popularity;
third program instructions to automatically push at least one base asset from the central repository of assets onto a mobile device of the subscriber, the at least one base asset is selected based on attributes of the mobile device of the subscriber, capabilities of the mobile device of the subscriber, and popularity of assets; and
fourth program instructions to, in response to a search query for a requested asset by a user, push the requested asset from the central repository of assets onto a mobile device of the user with the processor, wherein the first program instructions, the second program instructions, the third program instructions, and the fourth program instructions are stored on the computer readable storage medium.

* * * * *